(12) United States Patent
Li et al.

(10) Patent No.: US 12,265,231 B2
(45) Date of Patent: Apr. 1, 2025

(54) OPTICAL IDENTIFICATION MODULE AND DISPLAY PANEL

(71) Applicants: Beijing BOE Sensor Technology Co., Ltd., Beijing (CN); BOE Technology Group Co., Ltd., Beijing (CN)

(72) Inventors: Zefei Li, Beijing (CN); Yue Geng, Beijing (CN); Cheng Li, Beijing (CN); Zhonghuan Li, Beijing (CN); Chaoyang Qi, Beijing (CN); Kuiyuan Wang, Beijing (CN); Yi Dai, Beijing (CN); Yajie Feng, Beijing (CN); Xiaoguan Li, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 922 days.

(21) Appl. No.: 17/355,519

(22) Filed: Jun. 23, 2021

(65) Prior Publication Data

US 2022/0163812 A1 May 26, 2022

(30) Foreign Application Priority Data

Nov. 23, 2020 (CN) .......................... 202011320213.4

(51) Int. Cl.
*G06V 40/13* (2022.01)
*G02B 3/00* (2006.01)
(Continued)

(52) U.S. Cl.
CPC ........... *G02B 27/30* (2013.01); *G02B 3/0006* (2013.01); *G02B 5/208* (2013.01); *G06V 40/1318* (2022.01)

(58) Field of Classification Search
CPC ....... G06V 10/147; G06V 40/12; G06V 40/13
(Continued)

(56) References Cited

U.S. PATENT DOCUMENTS 11,783,619 B2 * 10/2023 Zhang .................... G02B 5/005
2017/0286743 A1 10/2017 Lee et al.
(Continued)

FOREIGN PATENT DOCUMENTS

| CN | 210605738 U | 5/2020 |
| WO | 2020031140 A2 | 2/2020 |

OTHER PUBLICATIONS

Chinese First Office Action dated Dec. 11, 2024 corresponding to application No. 202011320213.4.

*Primary Examiner* — Wyatt A Stoffa
*Assistant Examiner* — Seth D Moser
(74) *Attorney, Agent, or Firm* — Nath, Goldberg & Meyer; Joshua B. Goldberg

(57) ABSTRACT

The present disclosure provides an optical identification module and a display panel. The optical identification module includes a substrate, an identification structure and a collimation optical path structure, where the identification structure is arranged on the substrate, the collimation optical path structure is arranged on a light entering side of the identification structure, the optical identification module further includes a non-visible light filtering structure, and the non-visible light filtering structure is arranged in the collimation optical path structure and configured to filter non-visible light irradiated to the identification structure.

12 Claims, 5 Drawing Sheets

(51) Int. Cl.
  *G02B 5/20*      (2006.01)
  *G02B 27/30*     (2006.01)
(58) Field of Classification Search
  USPC .......................................................... 359/300
  See application file for complete search history.

(56)            References Cited

U.S. PATENT DOCUMENTS

2018/0068160 A1*  3/2018  Wu .................... H01L 27/14618
2019/0243154 A1*  8/2019  Hai ..................... G06V 40/1318
2019/0303639 A1* 10/2019  He ....................... G09G 3/3208
2020/0026898 A1   1/2020  Fan et al.

* cited by examiner

OPTICAL IDENTIFICATION MODULE AND DISPLAY PANEL

CROSS-REFERENCE TO RELATED APPLICATIONS

The present application claims the priority of Chinese Patent Application No. 202011320213.4, filed on Nov. 23, 2020, the contents of which are incorporated herein in their entirety by reference.

TECHNICAL FIELD

The present disclosure relates to the field of display technology, and particularly relates to an optical identification module and a display panel.

BACKGROUND

Due to uniqueness of fingerprint characteristics, fingerprint identification, as a biological characteristic identification mode, is widely applied to scenes such as unlocking under a screen, public security, bank authentication and the like of a terminal (such as a mobile phone), and audiences are very wide. In the related art, an optical fingerprint sensor, as a common fingerprint sensor, can be arranged below a screen, and is low in cost and has obvious advantages compared with other sensors.

In the optical fingerprint sensor, a collimation optical path structure is a key element for fingerprint imaging, which enables optical fingerprint signals passing through the screen to be clearly imaged on the fingerprint sensor in a collimating mode, so that fingerprints are identified.

In the related art, the optical fingerprint sensor below the screen needs to solve a problem of imaging in sunlight, after the sunlight penetrates through a finger, most of non-visible light (such as infrared light, ultraviolet light, and the like) with relatively strong light intensity can be incident to the optical fingerprint sensor, and the fingerprint signals obtained from light reflected by the fingerprints can be easily submerged by such non-visible light with relatively strong light intensity, so that the fingerprint signals cannot be identified.

SUMMARY

The present disclosure provides an optical identification module, including a substrate, an identification structure and a collimation optical path structure, the identification structure is arranged on the substrate, the collimation optical path structure is arranged on a light entering side of the identification structure, the optical identification module further includes a non-visible light filtering structure, the non-visible light filtering structure is arranged in the collimation optical path structure, and configured to filter non-visible light irradiated to the identification structure.

In some implementations, the optical identification module further includes a liquid-vapor filtering structure disposed in the collimation optical path structure and configured to filter liquid droplets and liquid vapor entering the collimation optical path structure.

In some implementations, the collimation optical path structure includes a collimating layer and a micro-lens layer, the collimating layer and the micro-lens layer are stacked with each other, and the collimating layer is closer to the identification structure than the micro-lens layer;

the non-visible light filtering structure is arranged between the collimating layer and the micro-lens layer.

In some implementations, the collimation optical path structure further includes a support layer disposed between the collimating layer and the micro-lens layer;

the non-visible light filtering structure is arranged on a side, proximal to the collimating layer, of the support layer, and/or the non-visible light filtering structure is arranged on a side, proximal to the micro-lens layer, of the support layer.

In some implementations, the collimation optical path structure includes a collimating layer, a support layer, and a micro-lens layer, the collimating layer, the support layer, and the micro-lens layer are stacked in series, and the collimating layer is closer to the identification structure than the micro-lens layer;

the non-visible light filtering structure is arranged on a side, away from the identification structure, of the micro-lens layer.

In some implementations, the micro-lens layer includes a micro-lens array and a protective layer disposed on a light entering side of the micro-lens array;

the non-visible light filtering structure is multiplexed as the protective layer.

In some implementations, the collimation optical path structure includes a collimating layer, a support layer, and a micro-lens layer, the collimating layer, the support layer, and the micro-lens layer are stacked in series, and the collimating layer is closer to the identification structure than the micro-lens layer;

the non-visible light filtering structure is arranged on a side, proximal to the identification structure, of the collimating layer.

In some implementations, the collimating layer includes a base substrate and a plurality of through holes formed in the base substrate, and the through holes are uniformly distributed;

the non-visible light filtering structure further extends into the through holes.

In some implementations, the liquid-vapor filtering structure is disposed on a side of the identification structure proximal to the collimation optical path structure.

In some implementations, the collimating layer includes a base substrate and a plurality of through holes formed in the base substrate, and the through holes are uniformly distributed;

the liquid-vapor filtering structure is arranged on a side, proximal to the collimation optical path structure, of the identification structure, and further extends into the through holes and covers side walls of the through holes and openings of the through holes at ends away from the identification structure.

In some implementations, the liquid-vapor filtering structure further extends to fully fill each of the through holes.

In some implementations, the non-visible light filtering structure is made of a light-transmissive resin material that absorbs non-visible light; or, the non-visible light filtering structure includes at least one stacked structure of silicon oxide and titanium oxide.

In some implementations, the liquid-vapor filtering structure is made of any one or two materials of silicon nitride, silicon oxide, indium tin oxide, silicone and waterproof adhesive.

The present disclosure further provides a display panel including a display module and the optical identification module described above;

the optical identification module is arranged on a side of the display module away from a display side of the display module, and the optical identification module is configured to identify a touch object on the display side of the display module.

In some implementations, the optical identification module and the display module are attached together through an optically transparent adhesive layer.

In some implementations, an air gap layer is disposed between the optical identification module and the display module.

In some implementations, the display module is a light-transmissive display module.

DESCRIPTION OF EMBODIMENTS

In order to make those skilled in the art better understand technical solutions of the present disclosure, the optical identification module and the display panel provided by the present disclosure are further described in detail below with reference to the accompanying drawings and the detailed description.

Figure 1:
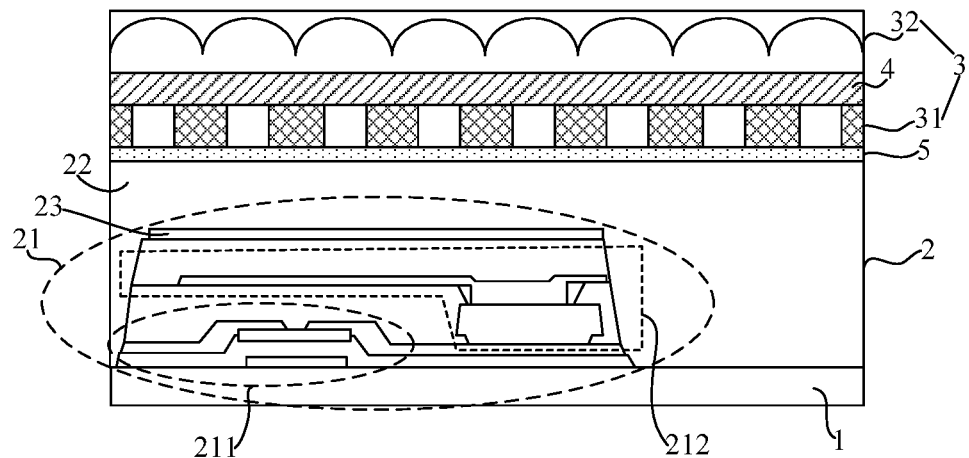
FIG. 1 is a schematic cross-sectional structural diagram of an optical identification module according to an embodiment of the present disclosure.
Figure 2:
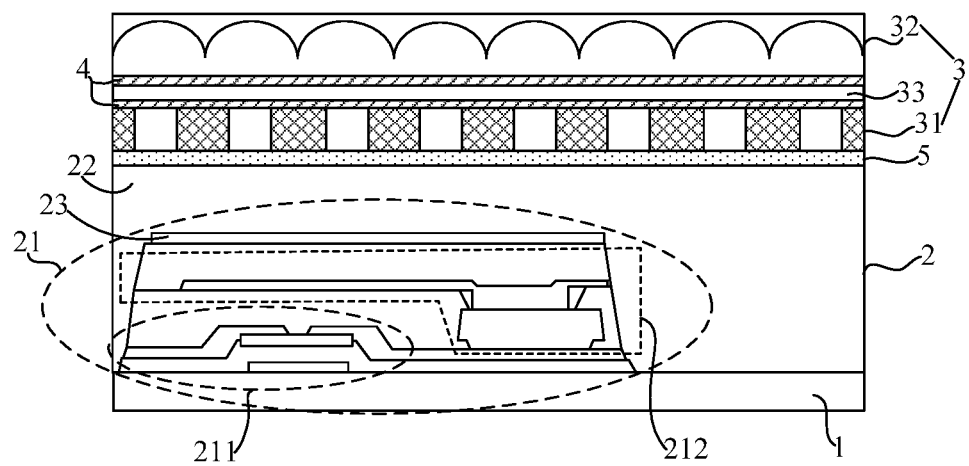
FIG. 2 is a schematic cross-sectional structural diagram of an optical identification module according to an embodiment of the present disclosure.

An embodiment of the present disclosure provides an optical identification module, and as shown in FIG. 1 and FIG. 2, the optical identification module includes a substrate 1, an identification structure 2 and a collimation optical path structure 3, the identification structure 2 is disposed on the substrate 1, the collimation optical path structure 3 is disposed on a light entering side of the identification structure 2, the optical identification module further includes a non-visible light filtering structure 4, and the non-visible light filtering structure 4 is disposed in the collimation optical path structure 3 and configured to filter non-visible light irradiated to the identification structure 2.

The optical identification module is arranged on a side of a display screen away from a display side of the display screen (i.e., arranged on a back side of the display screen), and is configured to perform optical identification on a touch object (such as a finger) on the display side of the display screen, that is, perform optical identification under the screen. The principle that the optical identification module identifies a finger touching the display side of the display screen is as follows: the display screen senses a contact of the finger and emits light with a relatively high brightness in a contact area to irradiate the finger, the light is reflected by the finger, and thus fingerprint texture of the finger is acquired by the light, the light carrying fingerprint information of the finger passes through the display screen and is incident to the identification structure 2. The light passing through the display screen are converged and collimated by the collimation optical path structure 3, in which the light with a relative large incident angle is filtered, so that optical signals formed by the light passing through the collimation optical path structure 3 has small or no crosstalk. The light passing through the collimation optical path structure 3 directly enters the identification structure 2, and the identification structure 2 can convert the optical signals formed by the light into electric signals, so that fingerprints of the finger are identified. In such process, non-visible light (such as infrared light, ultraviolet light and the like) in external sunlight can penetrate through the finger and is irradiated to the identification structure 2 through the collimation optical path structure 3, the light intensity of the non-visible light is stronger than that of the light reflected by the finger, and the optical signals formed by the light reflected from the fingerprints is easily submerged.

By providing the non-visible light filtering structure 4 in the collimation optical path structure 3, the non-visible light entering the collimation optical path structure 3 can be filtered, which avoids the non-visible light to penetrate through the touch object (e.g., finger) to be identified and enter the identification structure 2, reducing or eliminating an influence of the non-visible light with relatively strong light intensity on the optical signals formed by the light reflected from the touch object to be identified to the identification structure 2, and thereby an accuracy of the identification structure 2 identifying the touch object to be identified is ensured.

In some implementations, the optical identification module further includes a liquid-vapor filtering structure 5, and the liquid-vapor filtering structure 5 is disposed in the collimation optical path structure 3 and configured to filter liquid droplets and liquid vapor entering the collimation optical path structure 3. Since liquid droplets and liquid vapor (like water droplets and water vapor) in external environment easily enter the optical identification module, which may lead to impaired deformation of optical path structures in the optical identification module so that the optical identification module cannot operate normally, by providing the liquid-vapor filtering structure 5 in the collimation optical path structure 3, liquid droplets and liquid vapor invading in the optical identification module can be avoided from damaging the optical path structures, thereby ensuring an accuracy of identification of the optical identification module.

In some implementations, as shown in FIG. 1, the collimation optical path structure 3 includes a collimating layer 31 and a micro-lens layer 32, the collimating layer 31 and the micro-lens layer 32 are stacked, and the collimating layer 31 is closer to the identification structure 2 than the micro-lens layer 32; the non-visible light filtering structure 4 is arranged between the collimating layer 31 and the micro-lens layer 32.

Since a direct lamination of the collimating layer 31 and the micro-lens layer 32 may easily cause any one of the layers to be crushed or damaged, the non-visible light filtering structure 4 can also serve as a support for the collimating layer 31 and the micro-lens layer 32, and prevent any one of the collimating layer 31 and the micro-lens layer 32 from being crushed or damaged.

In addition, in the embodiment of the present disclosure, the substrate 1 may be a glass substrate or a flexible substrate (e.g., a polyimide substrate). The identification structure 2 may include a sensor array formed by a plurality of sensors 21 and a light-transmissive insulating layer 22 arranged on a side of the sensor array away from the substrate 1 and forming a protection for the sensor array, each of the sensors includes a thin film transistor 211 and a photodiode 212. The photodiode 212 can convert a received optical signal into an electrical signal. A source or drain of the thin film transistor 211 is coupled to an N electrode of the photodiode 212, and a P electrode of the photodiode 212 is coupled to a bias voltage supply terminal. The thin film transistor 211 can be turned on or off, thereby realizing output or non-output of the electric signal converted by the photodiode 212. The light-transmissive insulating layer 22 is relatively thick, which enables planarization of the surface of the identification structure 2. In addition, a shielding layer 23 is further disposed on the photodiode 212, and the shielding layer 23 can shield an external electromagnetic signal so as to avoid signal interference on the thin film transistor 211 and the photodiode 212.

In the embodiment of the present disclosure, the collimating layer 31 can collimate the light passing therethrough. When light passes through the collimating layer 31, stray light with a relatively large incident angle can be filtered out, so that optical signal crosstalk caused by the stray light with the relatively large incident angle is eliminated, and the image quality is improved. The micro-lens layer 32 includes a micro-lens array formed by a plurality of micro-lenses, and the micro-lens layer 32 can generate a convergence effect on light incident into the micro-lens array, so that the incident light in different directions can be converged in a relatively small angle range, and the utilization rate of the light in the optical identification process is improved.

In the embodiment of the present disclosure, the liquid-vapor filtering structure 5 is disposed on the side of the identification structure 2 proximal to the collimation optical path structure 3, and can filter the liquid droplets and the liquid vapor entering the collimation optical path structure 3, so as to prevent an invasion of the liquid droplets and the liquid vapor from affecting the identification accuracy of the optical identification module.

In some implementations, the non-visible light filtering structure 4 may be made of a light-transmissive resin material capable of absorbing non-visible light, such as a photosensitive resin material with a high light transmittance in a blue-green band and a very low light transmittance in infrared band, which can filter infrared light, for example, acrylic resin or the like may be employed. Alternatively, the non-visible light filtering structure 4 may include at least one stacked structure of silicon oxide and titanium oxide, which can make the non-visible light incident thereon reflected and interfered, and the reflected and interfered light cancel each other out to reduce or eliminate the non-visible light, such as infrared light. In some implementations, the non-visible light filtering structure 4 is formed of a plurality of stacked structures, so as to substantially eliminate the non-visible light (such as infrared light) entering the non-visible light filtering structure 4. The above two types of materials for forming the non-visible light filtering structure 4 each filter light with a wavelength of about 600 nm (i.e., light in infrared band).

In some implementations, a thickness of the non-visible light filtering structure 4 ranges from 20 μm to 40 μm. A process for manufacturing the non-visible light filtering structure 4 may be an evaporation coating process or a sputtering coating process, and may also be a coating process. The non-visible light filtering structure 4 may be formed on the collimating layer 31 first to form an integrated component of the collimating layer 31 and the non-visible light filtering structure 4, and then the integrated component is disposed in the optical identification module. In such manner, an overall thickness of the optical identification module can be reduced.

In some implementations, the liquid-vapor filtering structure 5 is made of any one or two materials selected from silicon nitride, silicon oxide, indium tin oxide, silicone, and waterproof adhesive.

In some implementations, in response to that the liquid-vapor filtering structure 5 is made of silicon nitride, silicon oxide or indium tin oxide material, the liquid-vapor filtering structure 5 may be formed on the identification structure 2 by deposition of a coating film; in response to that the liquid-vapor filtering structure 5 is made of a silicone or waterproof adhesive material, the liquid-vapor filtering structure 5 may be formed on the identification structure 2 by coating.

In some implementations, as shown in FIG. 2, the collimation optical path structure 3 in the optical identification module may further include a support layer 33, where the support layer 33 is disposed between the collimating layer 31 and the micro-lens layer 32; the non-visible light filtering structure 4 is arranged on a side of the support layer 33 proximal to the collimating layer 33, and the non-visible light filtering structure 4 is arranged on a side of the support layer 33 proximal to the micro-lens layer 32. Certainly, the non-visible light filtering structure 4 may also be arranged on only one side of the support layer 33, such as on a side of the support layer 33 proximal to the collimating layer 31 or proximal to the micro-lens layer 32.

Due to a fact that an adhesion force or flexibility of the non-visible light filtering structure 4 made of the non-visible light absorbing material is insufficient, a proper material (such as PET) may be selected to form the support layer 33, and then the non-visible light filtering structure 4 is made on an upper surface and a lower surface of the support layer 33, on one hand, the support layer 33 can well support the collimating layer 31 and the micro-lens layer 32, and on the other hand, the arrangement of the non-visible light filtering structure 4 can also play a role in absorbing non-visible light.

Figure 3:
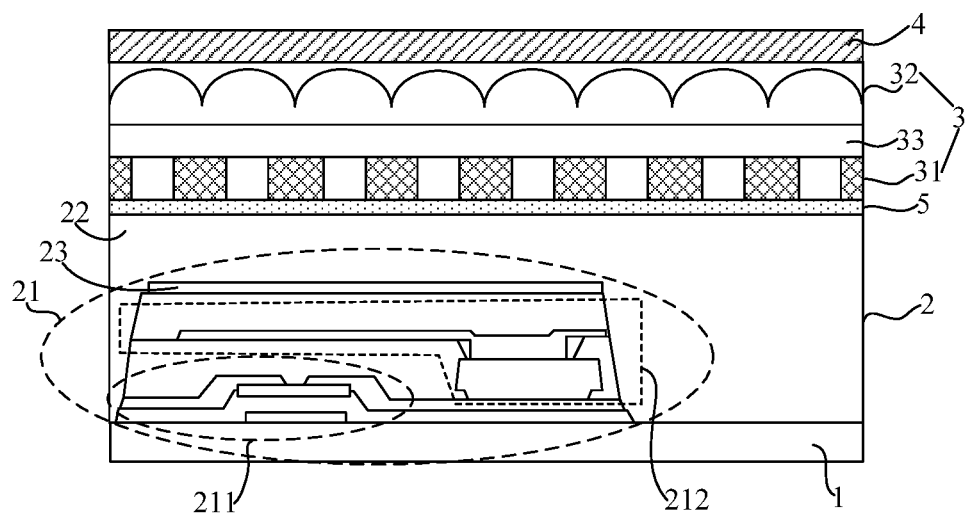
FIG. 3 is a schematic cross-sectional structural diagram of an optical identification module according to an embodiment of the present disclosure.

An embodiment of the present disclosure further provides an optical identification module, which is different from that in the above embodiment, as shown in FIG. 3, the collimation optical path structure 3 includes a collimating layer 31, a support layer 33, and a micro-lens layer 32, the collimating layer 31, the support layer 33, and the micro-lens layer 32 are sequentially stacked, and the collimating layer 31 is closer to the identification structure 2 than the micro-lens layer 32; the non-visible light-filtering structure 4 is arranged on a side of the micro-lens layer 32 away from the identification structure 2. With such arrangement, the function of filtering the non-visible light entering the collimation optical path structure 3 and preventing the non-visible light from entering the identification structure 2 after penetrating through the touch object to be identified (such as a finger) can also be achieved.

Figure 4:
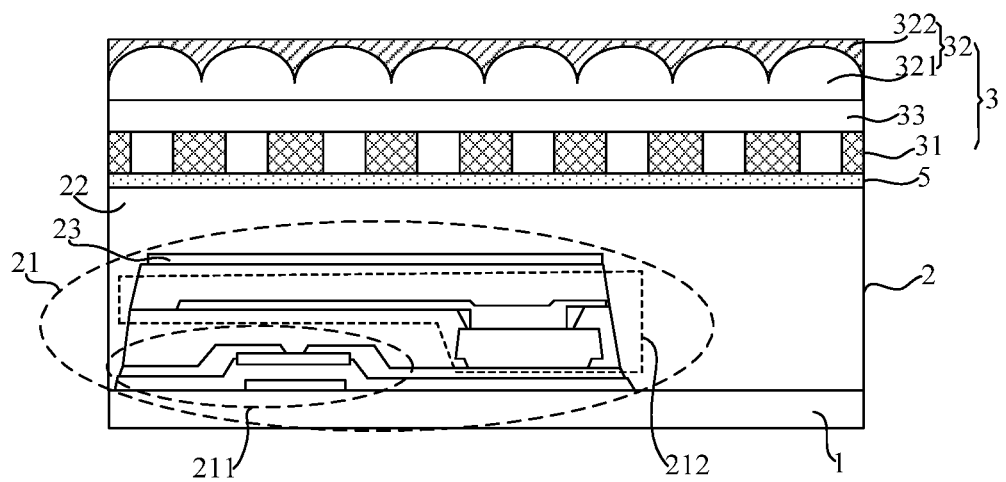
FIG. 4 is a schematic cross-sectional structural diagram of an optical identification module according to an embodiment of the present disclosure.

In some implementations, as shown in FIG. 4, the micro-lens layer 32 includes a micro-lens array 321 and a protective layer 322, the protective layer 322 is disposed on a light entering side of the micro-lens array 321; the non-visible light filtering structure 4 is multiplexed as the protective layer 322. With such arrangement, a thickness of the optical identification module integrated with the non-visible light filtering structure 4 can be further reduced.

It should be noted that, when the non-visible light filtering structure 4 is disposed on the side of the micro-lens layer 32 away from the identification structure 2, the requirement on the refractive index of the material of the non-visible light filtering structure 4 is slightly strict, and the non-visible light filtering structure 4 needs to cooperate the micro-lens layer 32 to play a role of converging light, so that incident light in different directions is converged into a relatively smaller angle range, and the utilization rate of the light in the optical identification process is improved.

Other structures and materials of the optical identification module in the present embodiment are the same as those in the above embodiment, and are not described herein again.

Figure 5:
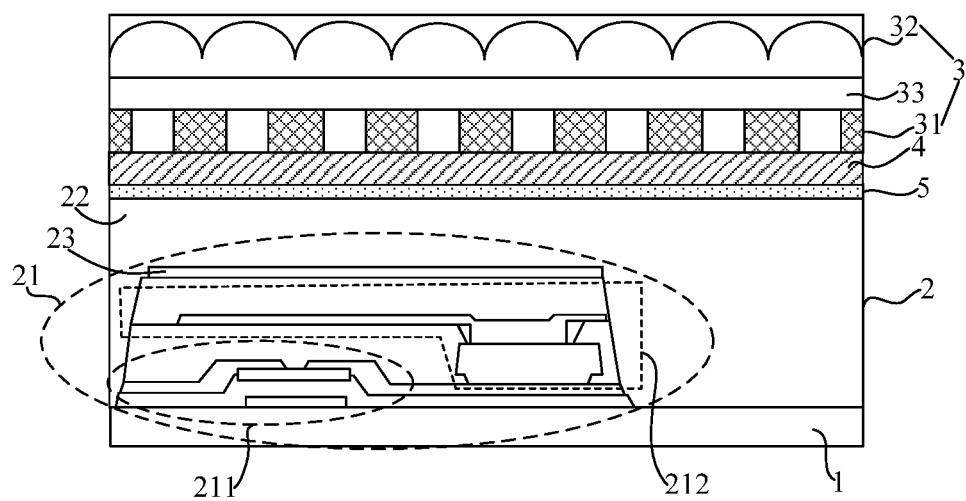
FIG. 5 is a schematic cross-sectional structural diagram of an optical identification module according to an embodiment of the present disclosure.

An embodiment of the present disclosure further provides an optical identification module, which is different from those in the above embodiments, as shown in FIG. 5, the collimation optical path structure 3 includes a collimating layer 31, a support layer 33, and a micro-lens layer 32, the collimating layer 31, the support layer 33, and the micro-lens layer 32 are sequentially stacked, and the collimating layer 31 is closer to the identification structure 2 than the micro-lens layer 32; the non-visible light filtering structure 4 is arranged on a side of the collimating layer 31 proximal to the identification structure 2. The non-visible light filtering structure 4 is closer to the collimating layer 31 than the liquid-vapor filtering structure 5. In such arrangement, the function of filtering the non-visible light entering the collimation optical path structure 3 and preventing the non-visible light from entering the identification structure 2 after penetrating through the touch object to be identified (such as a finger) can also be achieved.

Figure 6:
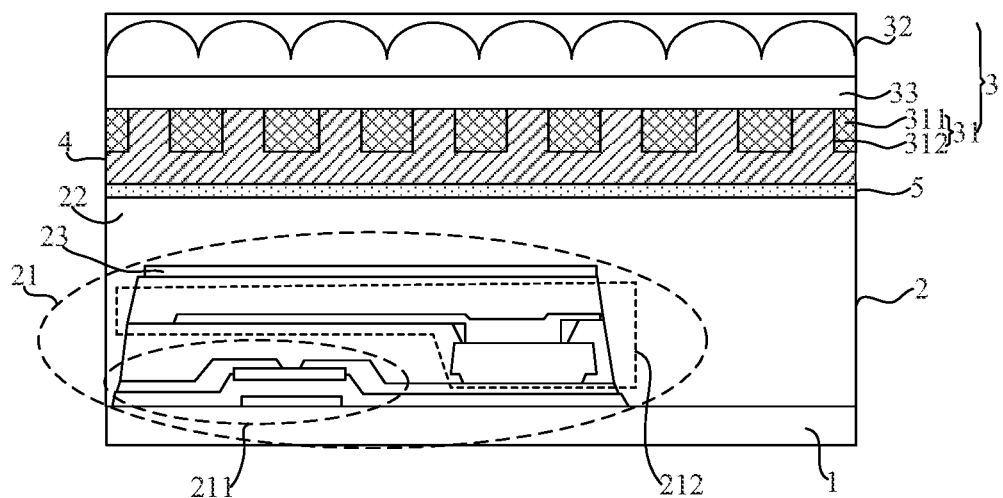
FIG. 6 is a schematic cross-sectional structural diagram of an optical identification module according to an embodiment of the present disclosure.

In some implementations, as shown in FIG. 6, the collimating layer 31 includes a base substrate 311 and a plurality of through holes 312 in the base substrate 311, the plurality of through holes 312 being uniformly distributed; the non-visible light filtering structure 4 further extends into the through holes 312. In some implementations, the non-visible light filtering structure 4 fully fills the through holes 312. Since both visible and non-visible light need to be collimated by the through holes 312, only the non-visible light in the through holes 312 need to be filtered. With such an arrangement, a thickness of the optical identification module integrated with the non-visible light filtering structure 4 can also be reduced.

Other structures and materials of the optical identification module in the present embodiment are the same as those in the above embodiment, and are not described herein again.

Figure 7:
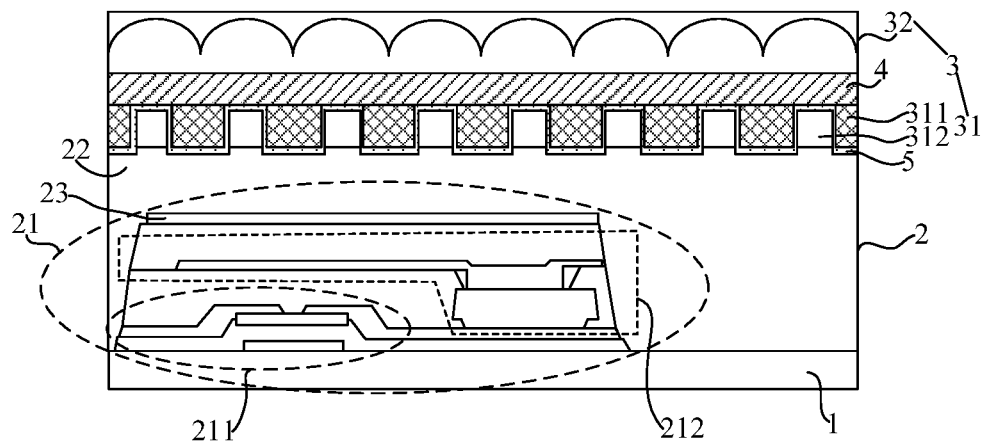
FIG. 7 is a schematic cross-sectional structural diagram of an optical identification module according to an embodiment of the present disclosure.

An embodiment of the present disclosure further provides an optical identification module, which is different from those in the above embodiments, as shown in FIG. 7, the collimating layer 31 includes a base substrate 311 and a plurality of through holes 312 formed in the base substrate 311, and the through holes 312 are uniformly distributed; the liquid-vapor filtering structure is disposed on a side of the identification structure 2 proximal to the collimation optical path structure 3, and the liquid-vapor filtering structure 5 further extends to the through holes 312, covers side walls of the through holes 312 and openings of the through holes 312 at ends away from the identification structure 2. With such arrangement, on one hand, the damage of liquid droplets and liquid vapor invading into the optical identification module to the optical path structure can be avoided, so that the identification accuracy of the optical identification module is ensured; on the other hand, a thickness of the optical identification module integrated with the non-visible light filtering structure 4 can be further reduced.

In the process of manufacturing the liquid-vapor filtering structure 5, the non-visible light filtering structure 4 may be first manufactured on the collimating layer 31, and then the liquid-vapor filtering structure 5 is manufactured on the side of the collimating layer 31 away from the non-visible light filtering structure 4, so that the liquid-vapor filtering structure 5 is formed on the side walls of the through holes 312 and covers the openings of the through holes 312 at the ends away from the identification structure 2 (parts of the liquid-vapor filtering structure 5 at the openings of the through holes 312 are actually formed on the non-visible light filtering structure 4). That is, the non-visible light filtering structure 4, the collimating layer 31 and the liquid-vapor filtering structure 5 may be integrated into an integrated component, and then the integrated component may be disposed in the optical identification module.

Figure 8:
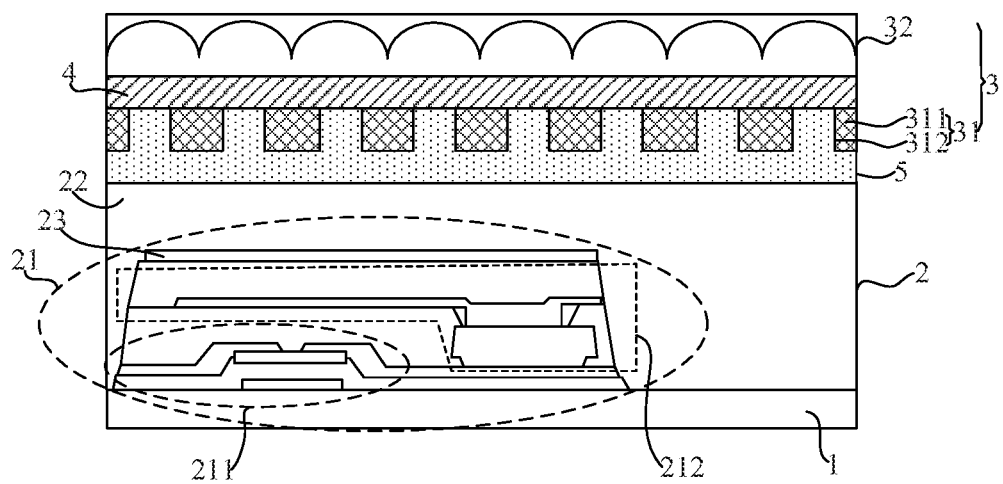
FIG. 8 is a schematic cross-sectional structural diagram of an optical identification module according to an embodiment of the present disclosure.

In some implementations, as shown in FIG. 8, the liquid-vapor filtering structure 5 further extends to fully fill each of the through holes 312. In such case, the material of the liquid-vapor filtering structure 5 needs to be selected according to the influence of the refractive index of the material on the optical path, so that the collimating function of the collimating layer 31 on the light is not affected when the liquid-vapor filtering structure 5 fully fills each of the through holes 312.

Other structures and materials of the optical identification module in the present embodiment are the same as those in the above embodiments, and are not described herein again.

In the optical identification module in the above embodiments, the non-visible light filtering structure is provided in the collimation optical path structure, and can filter the non-visible light entering in the collimation optical path structure, and thus the non-visible light penetrating through the touch object to be identified is prevented from entering the identification structure, thereby reducing or eliminating the influence of the non-visible light with the relatively strong light intensity on the signal formed by the light reflected from the touch object to be identified to the identification structure, and further ensuring the identification accuracy of the identification structure.

Figure 9:
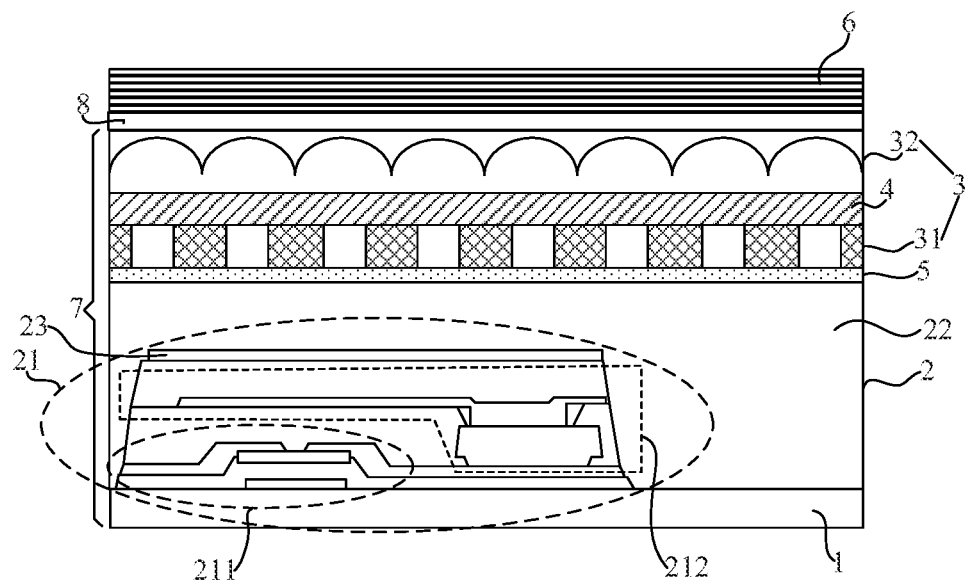
FIG. 9 is a schematic cross-sectional structural diagram of a display panel according to an embodiment of the present disclosure.

An embodiment of the present disclosure further provides a display panel, as shown in FIG. 9, including a display module 6, and further including an optical identification module 7 in any of the embodiments described above; the optical identification module 7 is disposed on a side (i.e., a back side) of the display module 6 away from a display side of the display module 6, and the optical identification module 7 is configured to identify a touch object on the display side of the display module 6. That is, the optical identification module 7 is arranged to enable the display panel to realize the identification under a screen thereof.

In some implementations, the optical identification module 7 and the display module 6 are bonded together through an optically transparent adhesive layer 8, so as to achieve tight bonding between the optical identification module 7 and the display module 6. A thickness of the optically transparent adhesive layer 8 may range from 10 µm to 20 µm.

In some implementations, an air gap layer may further be disposed between the optical identification module 7 and the display module 6, and the air gap layer may enable non-tight coupling between the optical identification module 7 and the display module 6. Positions of the optical identification module 7 and the display module 6 are fixed through a middle frame supporting and fixing the display panel, a gap is formed between the optical identification module 7 and the display module 6, and air is filled in the gap, so that an air gap layer is formed.

In some implementations, the display module 6 is a light-transmissive display module, for example, the display module 6 is an OLED display module.

The display panel provided by the embodiment can improve the accuracy of the identification under the screen of the display panel by adopting the optical identification module in any embodiment described above.

The display panel provided in the embodiment of the present disclosure may be any product or component having a display function, such as an OLED panel, an OLED television, a display, a mobile phone, and a navigator.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. An optical identification module, comprising a substrate, an identification structure and a collimation optical path structure, wherein the identification structure is arranged on the substrate, the collimation optical path structure is arranged on a light entering side of the identification structure, the optical identification module further comprises a non-visible light filtering structure, and the non-visible light filtering structure is arranged in the collimation optical path structure and is configured to filter non-visible light irradiated to the identification structure, wherein the collimation optical path structure comprises a collimating layer and a micro-lens layer, the collimating layer and the micro-lens layer being stacked and the collimating layer being closer to the identification structure than the micro-lens layer;

the collimating layer comprises a base substrate and a plurality of through holes formed in the substrate, the plurality of through holes being uniformly distributed;

the non-visible light filtering structure is arranged on a side, proximal to the identification structure, of the collimating layer, and extends into the through holes.

2. The optical identification module of claim 1, further comprising a liquid-vapor filtering structure disposed in the collimation optical path structure and configured to filter liquid droplets and liquid vapor entering the collimation optical path structure.

3. The optical identification module of claim 2, wherein the liquid-vapor filtering structure is disposed on a side of the identification structure proximal to the collimation optical path structure.

4. The optical identification module of claim 2, wherein the liquid- vapor filtering structure is made of one or two of silicon nitride, silicon oxide, indium tin oxide, silicone and waterproof adhesive.

5. The optical identification module of claim 1, wherein the collimation optical path structure further comprises a support layer disposed between the collimating layer and the micro-lens layer.

6. The optical identification module of claim 1, wherein the collimation optical path structure further comprises a support layer, the collimating layer, the support layer, and the micro-lens layer being stacked in sequence.

7. The optical identification module of claim 6, wherein the micro-lens layer comprises a micro-lens array and a protective layer, the protective layer being disposed on a light entering side of the micro-lens array.

8. The optical identification module of claim 1, wherein the non-visible light filtering structure is made of a light-transmissive resin material capable of absorbing non-visible light;

or, the non-visible light filtering structure comprises at least one stacked structure of silicon oxide and titanium oxide.

9. A display panel, comprising a display module and the optical identification module of claim 1;

the optical identification module is arranged on a side of the display module away from a display side of the display module, and the optical identification module is configured to identify a touch object on the display side of the display module.

10. The display panel of claim 9, wherein the optical identification module and the display module are bonded together by an optically transparent adhesive layer.

11. The display panel of claim 9, wherein an air gap layer is disposed between the optical identification module and the display module.

12. The display panel of claim 9, wherein the display module is a light- transmissive display module.

* * * * *